UNITED STATES PATENT OFFICE.

GEORGE EVANS, OF STROUD GREEN, ENGLAND.

PROCESS OF PREPARING RED OXID OF IRON AND ZINC SULFATE.

No. 914,649.

Specification of Letters Patent.

Patented March 9, 1909.

Application filed May 22, 1908. Serial No. 434,283.

*To all whom it may concern:*

Be it known that I, GEORGE EVANS, a subject of the King of Great Britain, residing at 103 Mount View road, Stroud Green, Middlesex, England, have invented a new and useful Process of Preparing Red Oxid of Iron and Zinc Sulfate; and I do hereby declare that the following is a full, clear, and exact description of the invention, which will enable others skilled in the art to which it appertains to make and use the same.

This invention relates to a process for preparing red oxid of iron, zinc sulfate and sulfuric acid, and the principal objects of my invention are: 1st, the obtaining of the zinc as sulfate in solution with a view of its ultimate utilization as metal or any compound of marketable value, and 2nd, the utilization of the iron in the form of pigment.

Attempts have been made from time to time to extract by means of sulfuric acid of various degrees of concentration the zinc which exists as oxid or carbonate in certain minerals, ores or tailings which may be too poor in zinc to be treated profitably by any of the ordinary processes. Most of these attempts have failed commercially, chiefly on account of the iron nearly always present in the crude mineral, which iron uses up a large quantity of sulfuric acid, and occasions further trouble by entering into solution, as sulfate or sulfates of iron, along with the sulfate of zinc.

Now, my invention has for its object a process wherein instead of being a drawback, the presence of iron in the mineral is of advantage, the said process aiming at obtaining a solution of zinc sulfate free from iron and all the iron originally present, or added in course of the treatment herein described, as the red oxid of iron, a valuable material for making paint or for use as a polishing powder.

In carrying out my invention I proceed as follows, that is to say, I add to the mineral, ore, or tailings, a certain amount of ferruginous material—burnt pyrites, raw or calcined iron ore—the proportion depending on the percentage of iron present in the original mineral, ore, or tailings, and on the nature of the residue to be aimed at. For example, if I desire a high grade residue, consisting almost entirely of ferric oxid, I add a larger proportion of the ferruginous matter than if the residue is intended only to form material for cheap paints.

The materials are thoroughly well ground and incorporated, and are then mixed with sulfuric acid of about 50° Baumé; too highly concentrated an acid I have found to be wasteful and inefficient, while by using acid of this strength I find that an intimate mixture of all the ingredients can be obtained, and that no portion of the material gets coated with a crust of any anhydrous sulfate so as to be protected from the action of the acid. The quantity of acid used must be sufficient to convert into sulfates all the metals present that are capable of being sulfatized.

When any appreciable quantities of tin, lead, tungsten and other metals giving insoluble or difficultly soluble products when treated with sulfuric acid are present, I find it best to leach out all the soluble sulfates of iron, zinc, etc., before attempting to ignite or calcine. In such cases the leach liquid containing all the soluble sulfates is evaporated to dryness and the substance left on evaporation calcined or ignited to destroy the sulfates of iron, etc. and leached as before. From the residue left on the first leaching, *i. e.*, the insoluble sulfate of lead or other insoluble substances, the lead or other metal may be obtained by any of the ordinary processes. The mixture is then calcined or ignited at a temperature sufficiently high to decompose all the sulfate or sulfates of iron present; most of the iron should be present as ferric sulfate; but the calcination or ignition must always be done in a current of air, and ample time should be allowed for the conversion of all the iron into the ferric state, and so that all the sulfur in the iron sulfates and other decomposable sulfates is driven off in the form of sulfur trioxid. The mass is then leached out with water or very dilute sulfuric acid so as to obtain in solution as zinc sulfate all the zinc present in the original material and leave the iron as an insoluble residue of ferric oxid. The sulfur trioxid driven off during ignition or calcination is converted into sulfuric acid or stored as trioxid by any of the ordinary methods.

I claim—

1. The herein described process of treating low grade zinc ore containing iron, tin, lead, etc., which consists in incorporating therewith ferruginous material, mixing the materials with sulfuric acid of about 50° Baumé, to convert the iron and zinc into sulfates, leaching out the sulfates of iron and zinc and separating the solid residue therefrom, treating the residue to obtain lead, tin etc., calcining the sulfates of zinc and iron to decompose the iron sulfate and drive off the sulfur, leaching out the zinc sulfate and separating therefrom the iron as ferric oxid.

2. In the herein described process of treating low grade zinc ore containing iron, the improvement which consists in incorporating therewith a quantity of ferruginous material, mixing the materials with sulfuric acid of about 50° Baumé in sufficient quantity to convert all the metals present which are capable of being sulfatized into sulfates, calcining the mixture in a current of air to decompose all the sulfates of iron present and drive off the sulfur as sulfur trioxid and leaching out the zinc present and separating from the mixture the residue of iron as ferric oxid.

3. The herein described process of treating low grade zinc ores containing iron, which consists in treating the ore with sulfuric acid of about 50° Baumé to convert the sulfatizable metals into sulfates, calcining the mixture to decompose the sulfates of iron present, and drive off the sulfur, leaching out the zinc present, and separating from the mixture the residue of ferric oxid, substantially as described.

GEORGE EVANS.

Witnesses:
C. G. REDFERN,
A. ALBUTT.